(12) United States Patent
Yiu

(10) Patent No.: US 7,460,361 B2
(45) Date of Patent: Dec. 2, 2008

(54) DISPLAY HAVING A QUICK DETACHABLE BEARING BRACKET

(75) Inventor: Yu-Shan Yiu, Jhonghe (TW)

(73) Assignee: Hannspree, Inc. (TW)

( * ) Notice: Subject to any disclaimer, the term of this patent is extended or adjusted under 35 U.S.C. 154(b) by 858 days.

(21) Appl. No.: 11/091,443

(22) Filed: Mar. 29, 2005

(65) Prior Publication Data

US 2006/0168866 A1 Aug. 3, 2006

(30) Foreign Application Priority Data

Dec. 21, 2004 (TW) .............................. 93220597 U (51) Int. Cl.
G06F 1/16 (2006.01)
(52) U.S. Cl. .................. 361/681; 248/917; 248/919
(58) Field of Classification Search ................. 361/681; 248/146, 291.1, 432, 917, 919; 345/169, 345/903, 905
See application file for complete search history.

(56) References Cited

U.S. PATENT DOCUMENTS

| | | | | |
|---|---|---|---|---|
| 5,138,565 A | * | 8/1992 | Satou | 361/681 |
| 5,144,290 A | * | 9/1992 | Honda et al. | 248/917 |
| 5,697,588 A | * | 12/1997 | Gonzalez et al. | 248/922 |
| 6,108,195 A | * | 8/2000 | Behl et al. | 361/681 |
| 6,585,201 B1 | * | 7/2003 | Reed | 248/181.1 |
| 6,905,099 B2 | * | 6/2005 | Sung | 248/146 |
| 6,938,869 B2 | * | 9/2005 | Lin et al. | 248/919 |
| 7,168,665 B2 | * | 1/2007 | Hong et al. | 248/917 |
| 7,389,963 B2 | * | 6/2008 | Cho et al. | 248/917 |
| 7,424,991 B2 | * | 9/2008 | Kim et al. | 248/917 |
| 2004/0084588 A1 | * | 5/2004 | Liu et al. | 248/917 |
| 2004/0165344 A1 | * | 8/2004 | Lee | 361/681 |
| 2005/0041172 A1 | * | 2/2005 | Chin | 349/58 |
| 2005/0236533 A1 | * | 10/2005 | McRight et al. | 248/917 |

* cited by examiner

*Primary Examiner*—Anatoly Vortman
*Assistant Examiner*—Adrian S Wilson
(74) *Attorney, Agent, or Firm*—Lowe Hauptman Ham & Berner, LLP (57) ABSTRACT

A display is disclosed to include a base, a display panel, and a quick detachable bearing bracket for detachably securing the display panel to the base. The quick detachable bearing bracket includes a locating barrel fixedly fastened to the base, a coupling barrel fixedly fastened to the display panel and detachably sleeved onto the locating barrel, and a resilient retaining rod, which is fixedly fastened to the locating barrel for engaging into a longitudinal slot in the coupling barrel to lock the coupling barrel to the locating barrel upon insertion of the locating barrel into the coupling barrel.

9 Claims, 8 Drawing Sheets

DISPLAY HAVING A QUICK DETACHABLE BEARING BRACKET

RELATED APPLICATION

The present application is based on, and claims priority from, Taiwanese Application Number 093220597, filed Dec. 21, 2004, the disclosure of which is hereby incorporated by reference herein in its entirety.

BACKGROUND OF THE INVENTION

1. Field of the Invention

The present invention relates to a display, for example, a liquid crystal display (LCD) or a liquid crystal display television (LCD TV), and more particularly, to a display, which comprises a base, a display panel, and a quick detachable bearing bracket adapted to detachably secure the display panel to the base.

2. Description of Related Art

A regular display, for example, an LCD or an LCD TV, generally comprises a base, a display panel, and a pivot joint coupled between the base and the display panel for allowing the display panel to be rotated on the base to change the view angle. The pivot joint is a fixed joint that does not allow dismounting of the display panel from the base. According to this design, the user cannot change the base to fit different mounting requirements.

Therefore, it is desirable to provide a display that eliminates the aforesaid drawback.

SUMMARY OF THE INVENTION

The present invention has been accomplished under the circumstances in view. The display according to the present invention comprises a base, a display panel, and a quick detachable bearing bracket coupled between the base and the display panel. The quick detachable bearing bracket is comprised of a locating barrel, a coupling barrel, and a resilient retaining rod. The locating barrel is fixedly fastened to the base, and comprises an inner barrel member and an outer barrel member sleeved onto the inner barrel member. The inner barrel member comprises a tubular body inserted through the outer barrel member and partially protruding over the front side of the outer barrel member, and a first longitudinal slot formed in the peripheral wall of the tubular body at one side. The coupling barrel is fixedly fastened to the display panel and detachably sleeved onto the tubular body of the inner barrel member, and comprises a second longitudinal slot corresponding to the first longitudinal slot of the tubular body of the inner barrel member of the locating barrel. The resilient retaining rod is fixedly fastened to the inner barrel member of the locating barrel and adapted to lock the coupling barrel to the inner barrel member of the locating barrel. The resilient retaining rod has a rear end fixedly fastened to the inner barrel member, and a front end terminating at a transversely protruding front retaining portion insertable into the first longitudinal slot of the inner barrel member and the second longitudinal slot of the coupling barrel to lock the coupling barrel to the locating barrel. By means of forcing the resilient retaining rod backwards to disengage the transversely protruding front retaining portion from the longitudinal slot of the inner barrel member and the longitudinal slot of the coupling barrel, the display panel can be separated from the base. After disconnection of the display panel from the base, the user can fasten the display panel to the base again in a different angular position as desired.

The outer barrel member of the locating barrel further comprises engagement means, and the coupling barrel further comprises engagement means adapted to engage the engagement means of the outer barrel member to further prohibit relative rotation between the coupling barrel and the locating barrel. The engagement means of the outer barrel member comprises at least one beveled notch. The engagement means of the coupling barrel comprises at least one protrusion adapted to engage the at least one beveled notch of the engagement means of the outer barrel member.

Further, the inner barrel member comprises an opening formed in the tubular body near a rear end of the tubular body. The outer barrel member comprises an opening corresponding to the opening of the inner barrel member. The resilient retaining rod comprises a transversely protruding middle press portion insertable through the opening of the inner barrel member and the opening of the outer barrel member for pressing by an external object to disengage the transversely protruding front retaining portion from the longitudinal slot of the coupling barrel.

Further, the base comprises a front holder shell, and a back holder shell fastened to the front holder shell. The locating barrel is fixedly fastened to the base between the front holder shell and the back holder shell. The base further comprises a first rib formed integral with the front holder shell, and a second rib formed integral with the back holder shell corresponding to the first rib. The locating barrel comprises two locating grooves symmetrically formed in the periphery thereof at two opposite sides and respectively coupled to the first rib and second rib of the base.

The base can be made having a mounting face for fastening to a wall. The display panel can be a liquid crystal display (LCD), an organic light emitting diode (OLED) display, an LCD TV, or a plasma TV.

Further, as an alternative form of the present invention, the locating barrel is formed integral with the base that can be hung on the wall, or stood on the top of a table.

DETAILED DESCRIPTION OF THE PREFERRED EMBODIMENT

Figure 1:
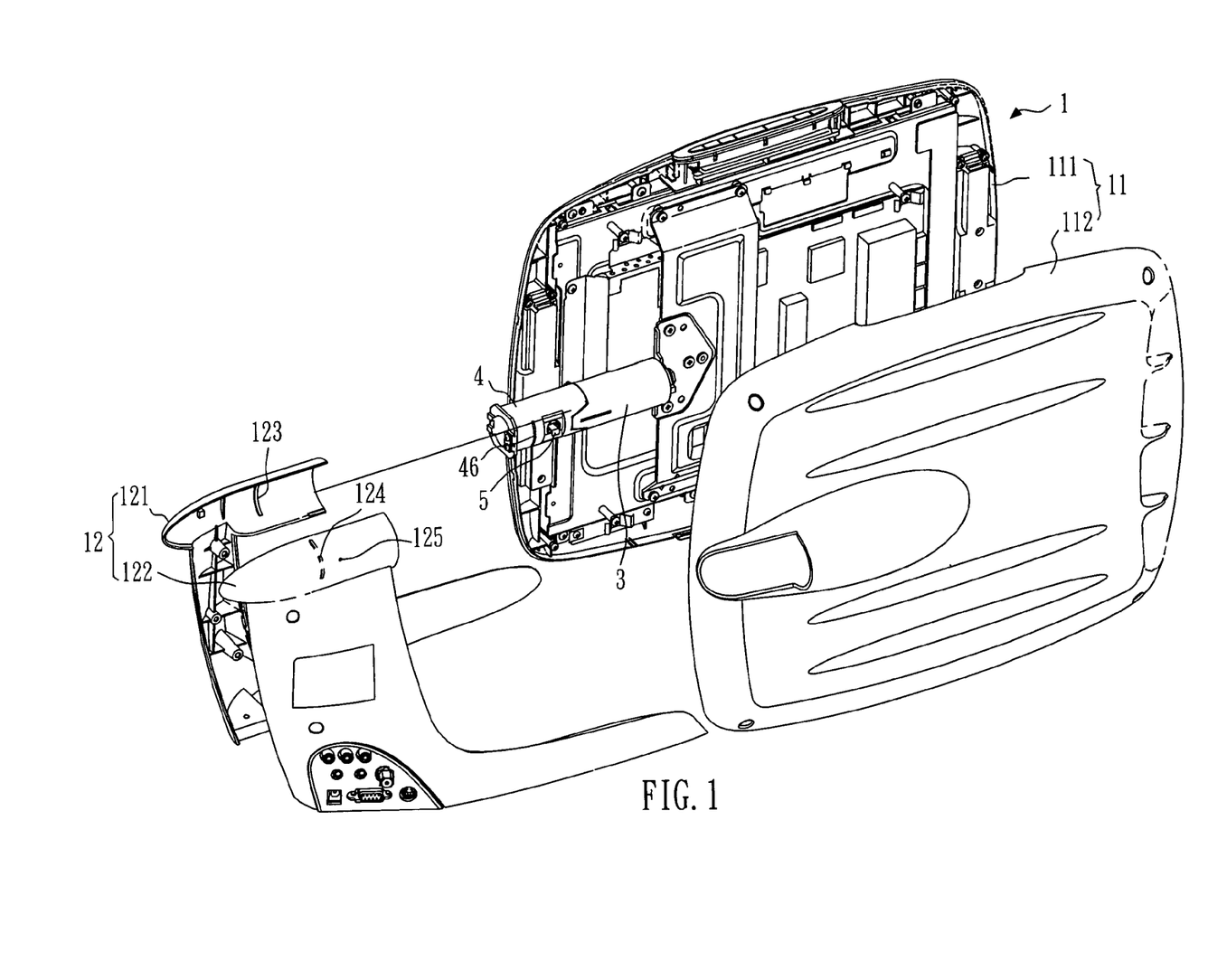
FIG. 1 is an exploded view of a display according to a first embodiment of the present invention.

Referring to FIG. 1, a display, for example, an LCD TV 1 is shown comprising a display panel 11 and a base 12. The display panel 11 comprises a front face panel 111 and a back cover 112. The back cover 112 covers the back side of the face panel 111. The base 12 comprises a front holder shell 121 and a back holder shell 122. The back holder shell 122 is fastened to the front holder shell 121.

Figure 2:
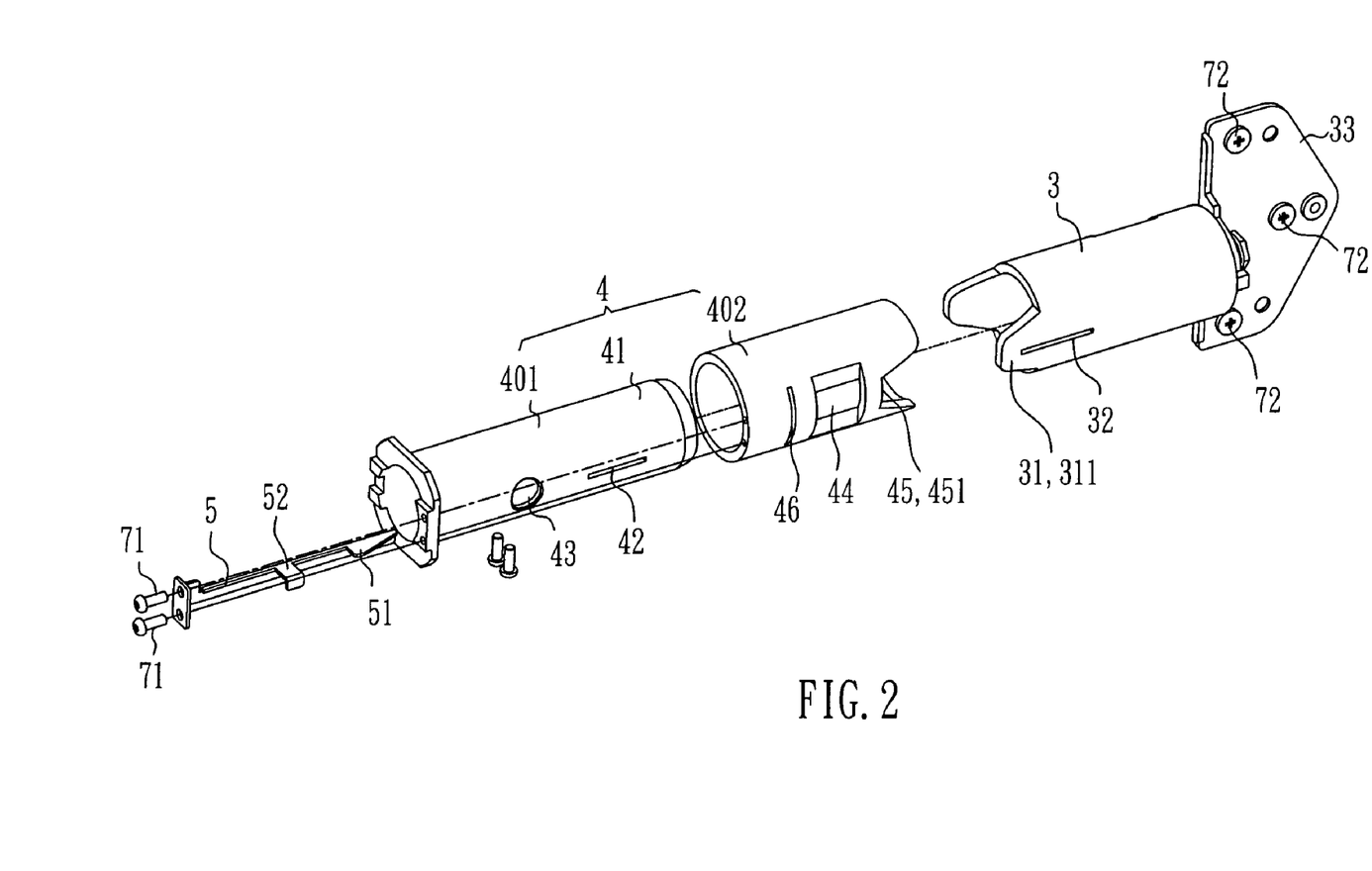
FIG. 2 is an exploded view of a quick detachable bearing bracket for a display according to the first embodiment of the present invention.

Referring to FIG. 2 and FIG. 1 again, a quick detachable bearing bracket in accordance with the first embodiment of the present invention is shown provided between the display panel 11 and the base 12. The quick detachable bearing bracket comprises a locating barrel 4, a resilient retaining rod 5, and a coupling barrel 3.

The locating barrel 4 is secured to the base 12 between the front holder shell 121 and the back holder shell 122. According to this embodiment, the base 12 comprises a first rib 123 formed integral with the front holder shell 121, and a second rib 124 formed integral with the back holder shell 122 and corresponding to the first rib 123. The locating barrel 4 has two locating grooves 46 symmetrically formed in the periphery at two opposite sides and respectively coupled to the first rib 123 and second rib 123 of the base 12. After the front holder shell 121 and the back holder shell 122 have been fixedly fastened together, the locating barrel 4 is locked to the base 12 between the front holder shell 121 and the back holder shell 122.

The locating barrel 4 is comprised of an inner barrel member 401 and an outer barrel member 402. The aforesaid two locating grooves 46 are formed in the periphery of the outer barrel member 402 at two opposite sides. The inner barrel member 401 comprises a tubular body 41 inserted through the outer barrel member 402 and partially protruding over the front side of the outer barrel member 402, and a longitudinal slot 42 formed in the tubular body 41 at one side. The outer barrel member 402 comprises front engagement means 45. According to this embodiment, the front engagement means 45 is comprised of two beveled notches 451 bilaterally formed in the front side of the outer barrel member 402.

The resilient retaining rod 5 is mounted in the inner barrel member 401 of the locating barrel 4 and fixedly fastened to the rear side of the inner barrel member 401 with two screws 71, comprising a transversely protruding front retaining portion 51 insertable into the longitudinal slot 42 of the inner barrel member 401 and a transversely protruding middle press portion 52.

According to this embodiment, the inner barrel member 401 of the locating barrel 4 has an opening 43 in the peripheral wall in line with the longitudinal slot 42 near the rear side. The outer barrel member 402 has an opening 44 in the peripheral wall corresponding to the opening 43 of the inner barrel member 401. The middle press portion 52 of the resilient retaining rod 5 is insertable through the openings 43 and 44 to the outside of the locating barrel 4. Further, the back holder shell 122 of the base 12 has a small through hole 125 corresponding to the middle press portion 52 of the resilient retaining rod 5.

The coupling barrel 3 has the front end thereof fixedly fastened to the display panel 11 between the front face panel 111 and the back cover 112. According to this embodiment, the coupling barrel 3 has the front end terminating at a mounting plate 33 fixedly fastened to the front face panel 111 and the back cover 112 with screws 72, and the rear end terminating at engagement means 31. According to this embodiment, the engagement means 31 comprises two protrusions 311 corresponding to the beveled notches 451. The coupling barrel 3 further has a longitudinal slot 32 corresponding to the longitudinal slot 42 of the inner barrel member 401.

Figure 3:
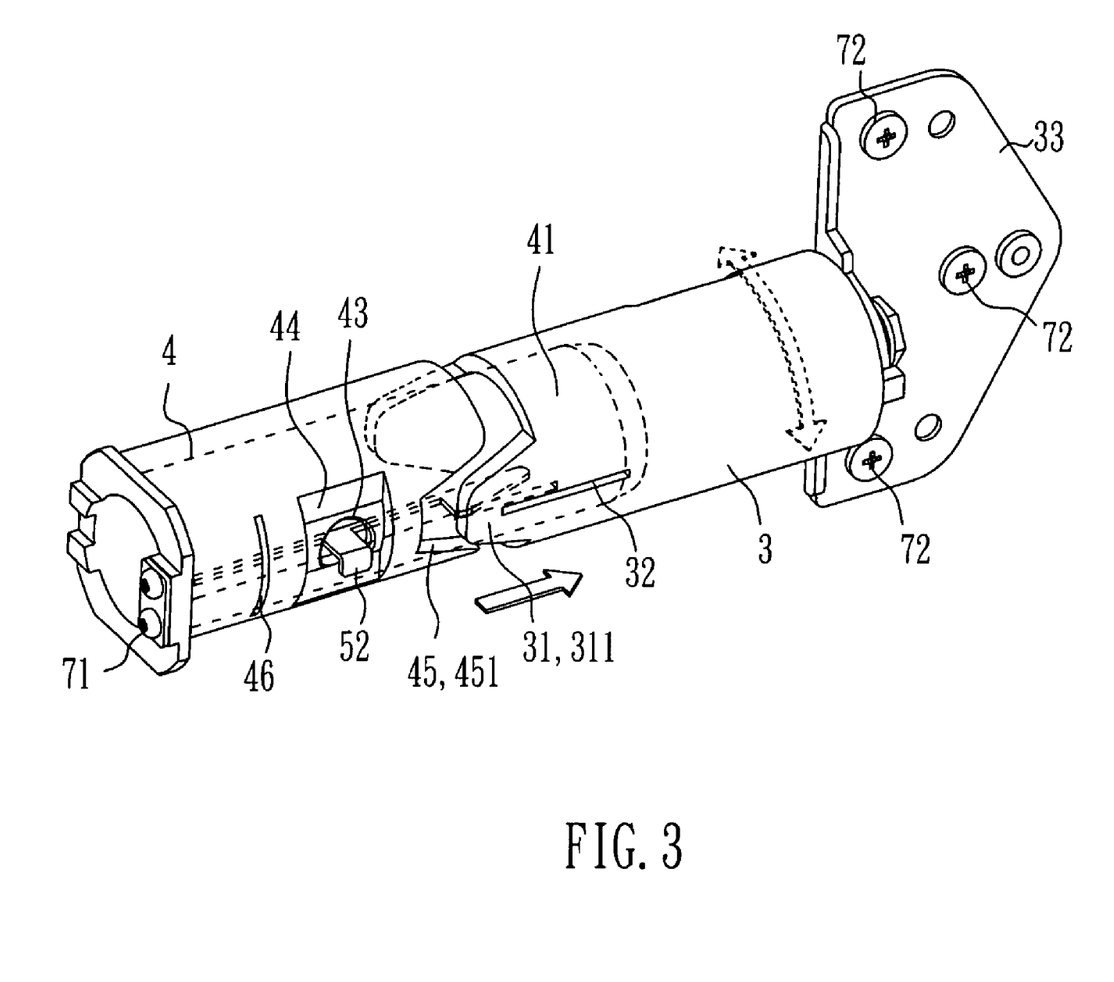
FIG. 3 is a schematic drawing showing the assembly process of the detachable bearing bracket according to the first embodiment of the present invention.
Figure 4:
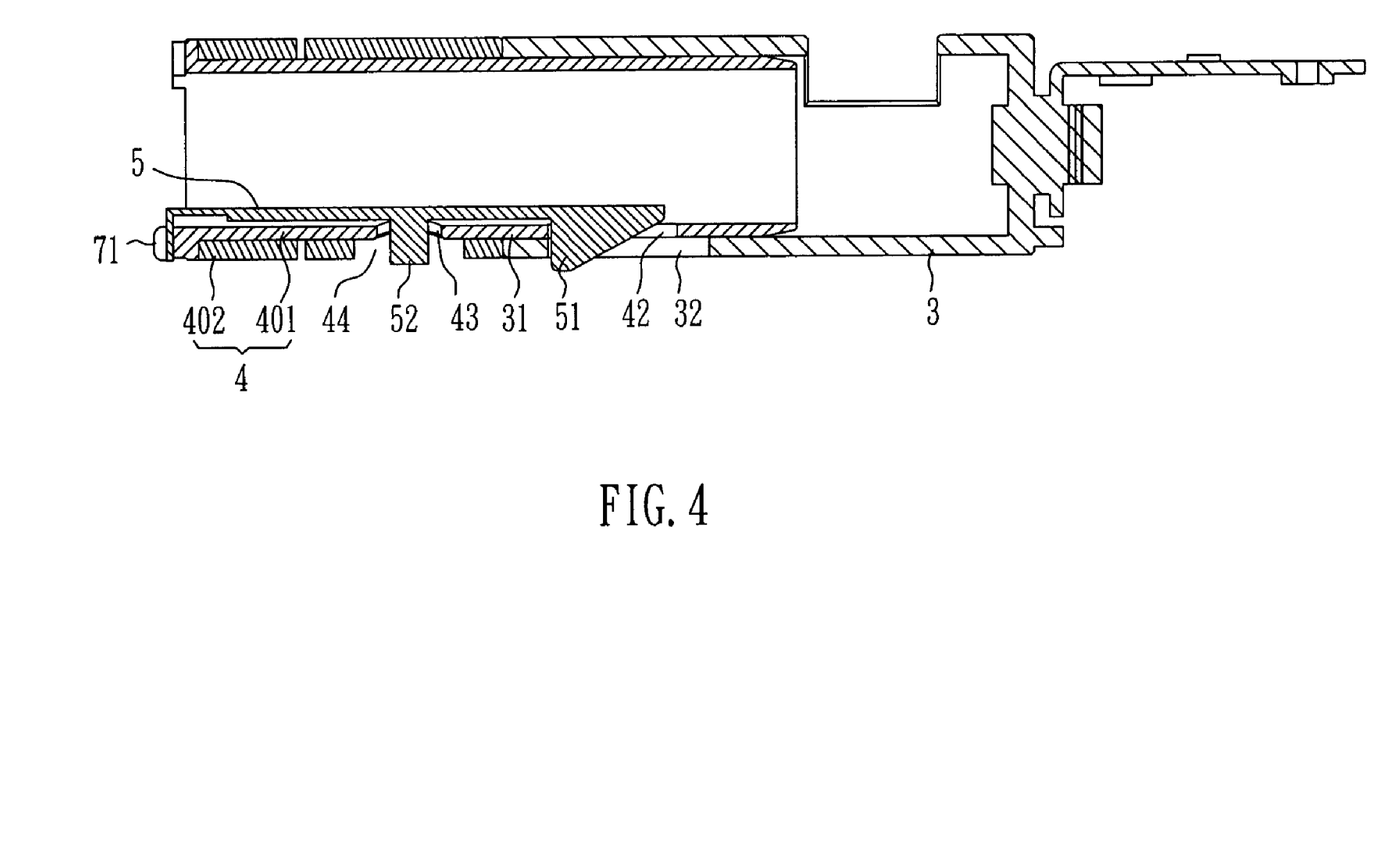
FIG. 4 is a sectional assembly view of the detachable bearing bracket according to the first embodiment of the present invention.
Figure 5:
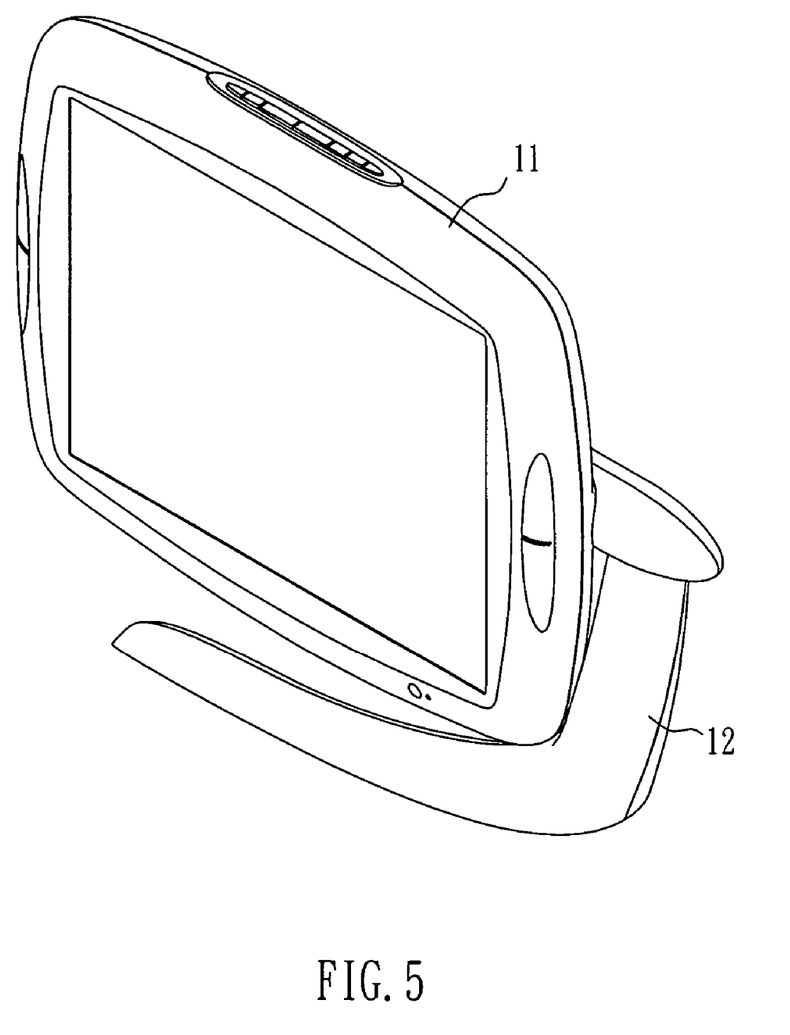
FIG. 5 is a perspective assembly view of FIG. 1.

Referring to FIGS. 3~5 and FIGS. 1 and 2 again, when wishing to affix the display panel 11 to the base 12, the coupling barrel 3 is sleeved onto the tubular body 41 of the inner barrel member 401 to force the protrusions 311 into the beveled notches 451 of the outer barrel member 402 and to prevent relative rotary motion between the coupling barrel 3 and the locating barrel 4, allowing the transversely protruding retaining portion 51 of the resilient retaining rod 5 to engage into the longitudinal slot 42 of the inner barrel member 401 and the longitudinal slot 32 of the coupling barrel 3. Therefore, the display panel 11 is locked to the base 12 as shown in FIG. 5.

Figure 6:
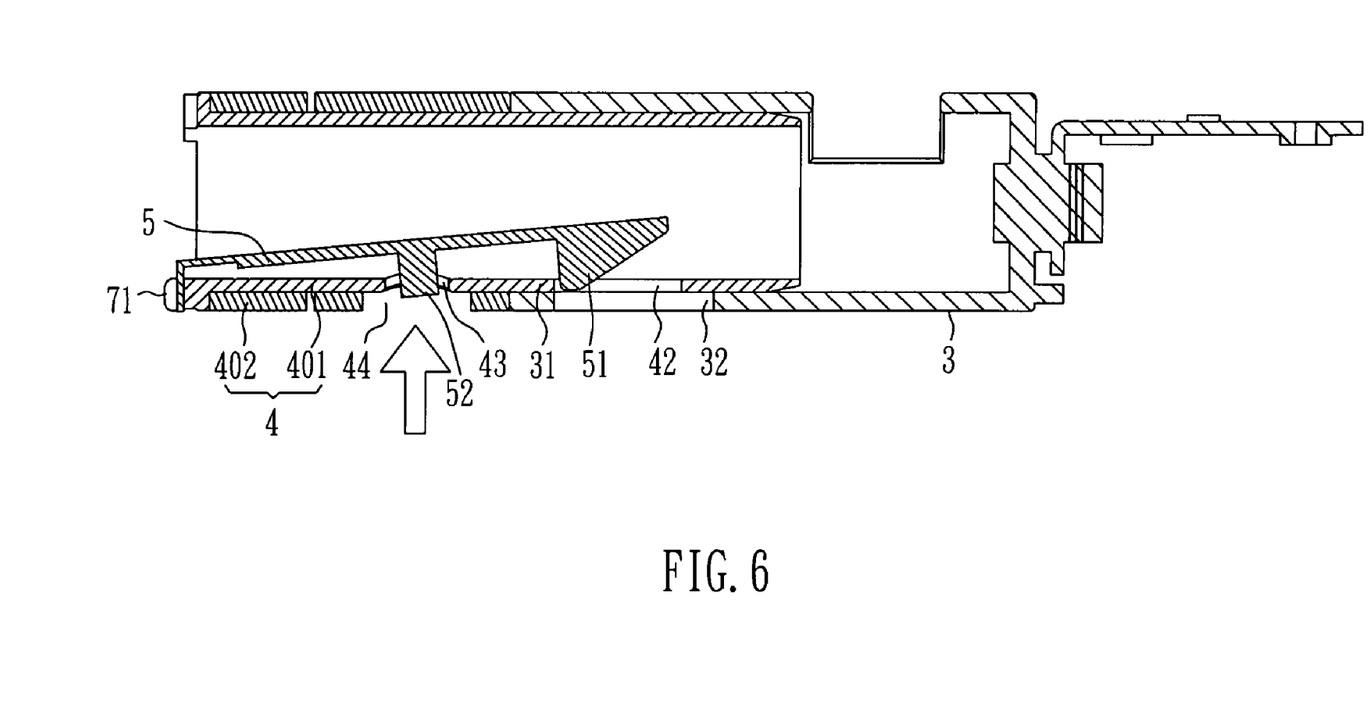
FIG. 6 is similar to FIG. 4 but showing the resilient retaining rod forced backwards and disengaged from the coupling barrel.

Referring to FIG. 6 and FIGS. 1 and 2 again, when wishing to remove the display panel 11 from the base 12, a pointed object (see the arrowhead sign in FIG. 6) is inserted through the small through hole 125 (see FIG. 1) to force the middle press portion 52 of theresilient retaining rod 5 backward and to further disengage the front retaining portion 51 inserted into the longitudinal slot 32 of the coupling barrel 3 (see FIG. 6), and then the coupling barrel 3 is removed from the locating barrel 4 to separate the display panel 11 from the base 12. When wishing to separate the display panel 11 from the base 12, the user must use a pointed object and insert it through the small through hole 125 to disengage the resilient retaining rod 5 from the coupling barrel 3. This design can prevent the accidental disengagement of the retaining rod 5 from the coupling barrel 3, such as by a child.

In order to present reverse action of the resilient retaining rod 5 after the middle press portion 52 of the resilient retaining rod 5 has been forced backward, the user can rotate the coupling barrel 3 relative to the inner barrel member 401 through an angle, for example, 30° to stop one protrusion 311 against the front retaining portion 51 of the resilient retaining rod 5, facilitating removal of the coupling barrel 3 from the locating barrel 4.

The aforesaid design of quick detachable bearing bracket is simple, cost effective and labor saving. After dismounting of the display panel 11 from the base 12, the user can fasten the display panel 11 to the base 12 again in a different angular position.

Figure 7:
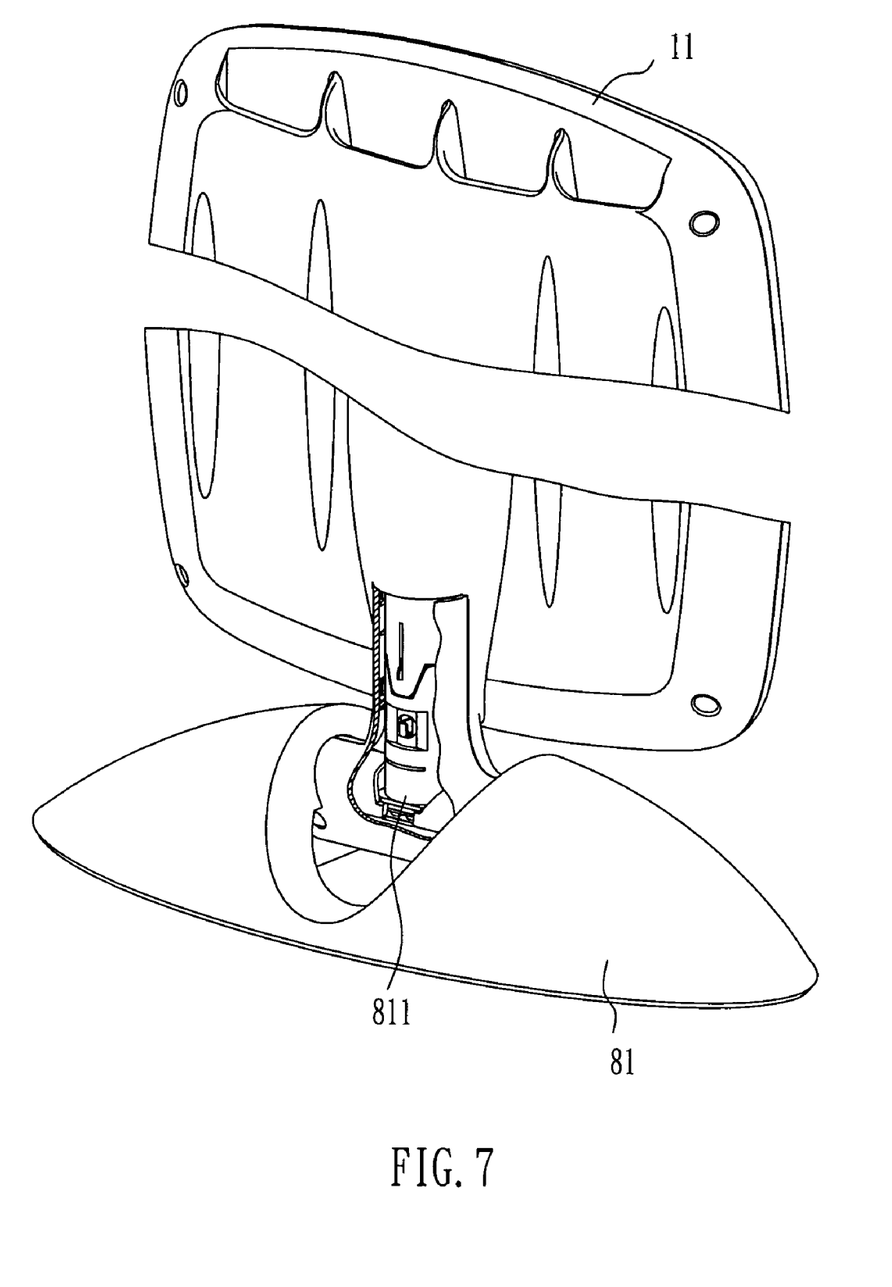
FIG. 7 is a perspective assembly view of a second embodiment of the present invention.

FIG. 7 is a perspective assembly view of the second embodiment of the present invention. This second embodiment is substantially the same as the aforesaid first embodiment with the exception that the locating barrel 811 of the quick detachable bearing bracket is formed integral with the base, referenced by 81. The locating barrel 811 has the same structure as the locating barrel 4 of the aforesaid first embodiment. The base 81 can be hung on the wall, or stood on the top of a table. After disconnection of the display panel 11 from the locating barrel 811, the display panel 11 can be fastened to the locating barrel 811 again in another angular position.

Figure 8:
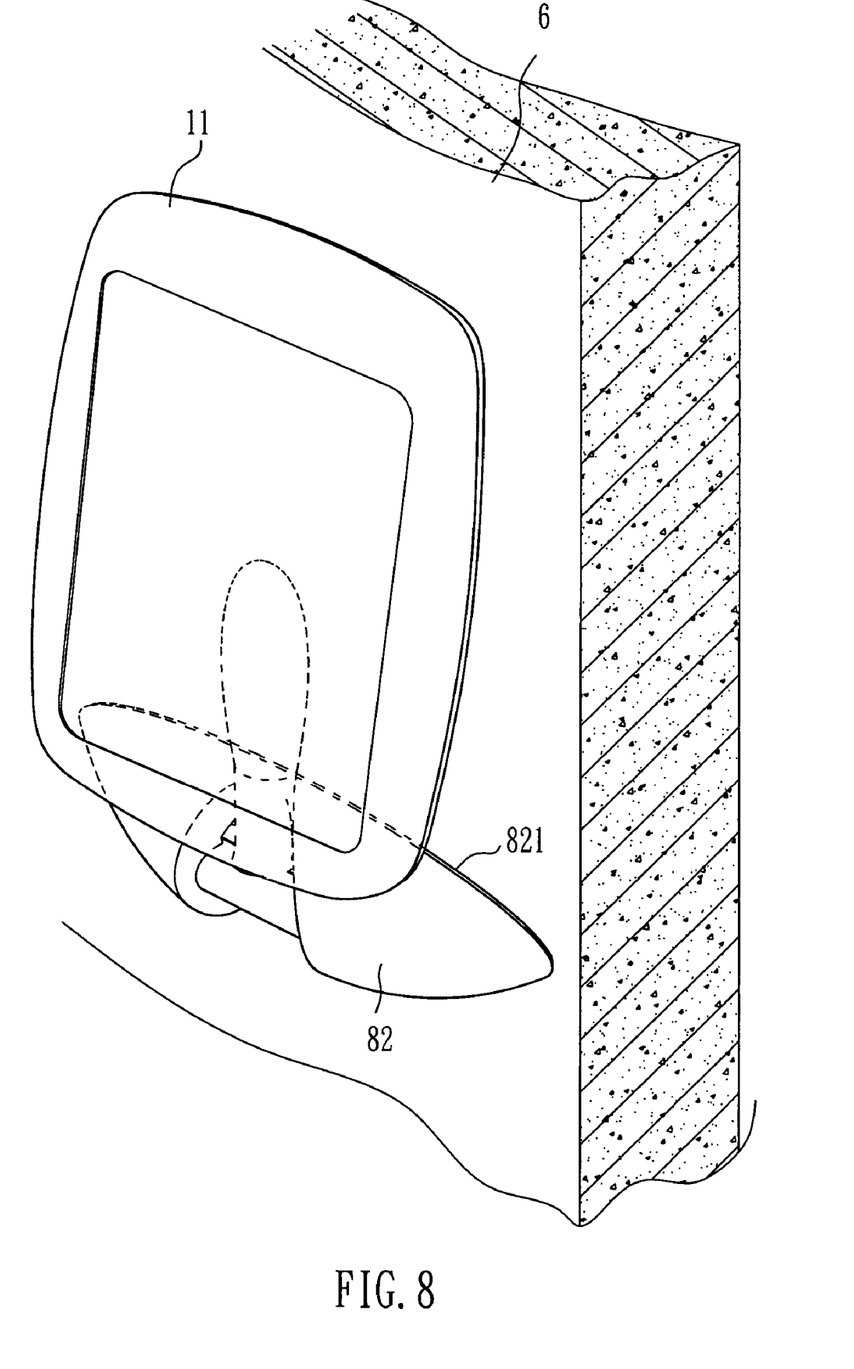
FIG. 8 is a perspective assembly view of a third embodiment of the present invention.

FIG. 8 is a perspective assembly view of the third embodiment of the present invention. According to this embodiment, the base, referenced by 82, has a mounting face 821 that can be affixed to a wall 6 for enabling the display panel 11 to be placed on the wall 6.

Although the present invention has been explained in relation to its preferred embodiments, it is to be understood that many other possible modifications and variations can be made without departing from the spirit and scope of the invention as hereinafter claimed.

What is claimed is:

1. A display comprising a base, a display panel, and a quick detachable bearing bracket coupled between said base and said display panel, said quick detachable bearing bracket comprising:

a locating barrel fixedly fastened to said base, said locating barrel comprising an inner barrel member and an outer barrel member sleeved onto said inner barrel member, said inner barrel member comprising a tubular body inserted through said outer barrel member and partially protruding over a front side of said outer barrel member, and a first longitudinal slot formed in the peripheral wall of said tubular body at one side;

a coupling barrel fixedly fastened to said display panel and detachably sleeved onto said tubular body of said inner barrel member, said coupling barrel comprising a second longitudinal slot corresponding to said first longitudinal slot of said tubular body of said inner barrel member of said locating barrel; and a resilient retaining rod fixedly fastened to said inner barrel member of said locating barrel and adapted to lock said coupling barrel to said inner barrel member of said locating barrel, said resilient retaining rod having a rear end fixedly fastened to said inner barrel member and a front end terminating at a transversely protruding front retaining portion insertable into said first longitudinal slot of said inner barrel member and said second longitudinal slot of said coupling barrel to lock said coupling barrel to said locating barrel.

2. The display as in claim 1, wherein said outer barrel member of said locating barrel comprises first engagement means; said coupling barrel comprises second engagement means adapted to engage said first engagement means of said outer barrel member and to further prohibit relative rotation between said coupling barrel and said locating barrel.

3. The display as in claim 2, wherein said first engagement means of said outer barrel member comprises at least one beveled notch; said second engagement means of said coupling barrel comprises at least one protrusion adapted to engage said at least one beveled notch of said engagement means of said outer barrel member.

4. The display as in claim 1, wherein said inner barrel member comprises a first opening formed in said tubular body near a rear end of said tubular body; said outer barrel member comprises a second opening corresponding to said first opening of said inner barrel member; said resilient retaining rod comprises a transversely protruding middle press portion insertable through said first opening of said inner barrel member and said second opening of said outer barrel member for pressing by an external force to disengage said transversely protruding front retaining portion from said second longitudinal slot of said coupling barrel.

5. The display as in claim 4, wherein said base comprises a small hole aimed at said second opening of said outer barrel member, said first opening of said inner barrel member and said transversely protruding middle press portion of said resilient retaining rod.

6. The display as in claim 1, wherein said base comprises a front holder shell, and a back holder shell fastened to said front holder shell; said locating barrel fixedly fastened to said base and located between said front holder shell and said back holder shell.

7. The display as in claim 6, wherein said base comprises a first rib formed integral with said front holder shell, and a second rib formed integral with said back holder shell corresponding to said first rib; said locating barrel comprises two locating grooves symmetrically formed in the periphery thereof at two opposite sides and respectively coupled to said first rib and second rib of said base.

8. The display as in claim 1, wherein said base further comprises a mounting face for fastening to a wall.

9. The display as in claim 1, which is a liquid crystal display television.

\* \* \* \* \*